(12) United States Patent
Kwitek

(10) Patent No.: US 6,336,614 B1
(45) Date of Patent: Jan. 8, 2002

(54) CONFORMABLE PORTABLE COMPUTER HAND PADS

(76) Inventor: Benjamin J. Kwitek, 1061 Valley View Dr., Canon City, CO (US) 81212

( * ) Notice: Subject to any disclaimer, the term of this patent is extended or adjusted under 35 U.S.C. 154(b) by 0 days.

(21) Appl. No.: 09/500,816

(22) Filed: Feb. 10, 2000

Related U.S. Application Data

(60) Provisional application No. 60/119,796, filed on Feb. 11, 1999.

(51) Int. Cl.[7] ................................................ B68G 5/00
(52) U.S. Cl. .................... 248/118; 248/118.1; 248/918; 361/680; 361/681; 361/683; 400/715
(58) Field of Search ............................... 248/118, 118.1, 248/918, 118.3, 118.5; 428/304.4, 192, 195; 400/715; 361/680, 681, 685

(56) References Cited

U.S. PATENT DOCUMENTS

| | | | | | |
|---|---|---|---|---|---|
| 5,633,286 | A | * | 5/1997 | Chen | 524/474 |
| 5,641,369 | A | * | 6/1997 | Kirchhoff et al. | 156/73.1 |
| 5,732,910 | A | * | 3/1998 | Martin | 248/218 |
| 5,803,416 | A | * | 9/1998 | Hanson et al. | 248/118 |
| 5,918,839 | A | * | 7/1999 | DuBois | 248/118 |
| 5,938,352 | A | * | 8/1999 | Chen | 248/118 X |
| 5,948,520 | A | * | 9/1999 | Hirsch | 428/304.4 |
| 5,954,303 | A | * | 9/1999 | Wolf et al. | 248/118.3 |
| 5,980,143 | A | * | 11/1999 | Bayer et al. | 248/118.1 X |
| 6,089,516 | A | * | 7/2000 | Yates | 248/118 |
| 6,195,255 | B1 | * | 2/2001 | Kim | 361/683 |
| 6,216,988 | B1 | * | 4/2001 | Hsu et al. | 248/118 |
| 6,229,697 | B1 | * | 5/2001 | Selker | 361/683 |
| 6,262,883 | B1 | * | 7/2001 | Kim | 361/680 |
| 6,262,886 | B1 | * | 7/2001 | DiFonzo et al. | 361/683 |

* cited by examiner

*Primary Examiner*—Ramon O. Ramirez
*Assistant Examiner*—Tan Le
(74) *Attorney, Agent, or Firm*—Welsh & Flaxman LLC

(57) ABSTRACT

This invention relates to ergonomic hand rests for computers and other electronic devices. In particular, the invention relates to soft, conforming hand pads constructed integrally with the keyboard body of portable laptop or notebook computers.

13 Claims, 3 Drawing Sheets

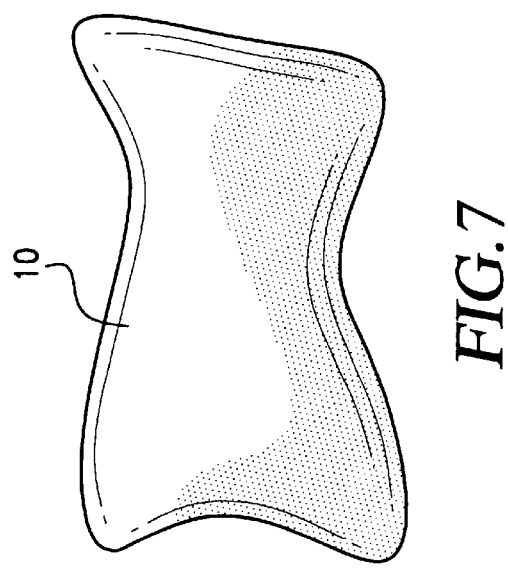
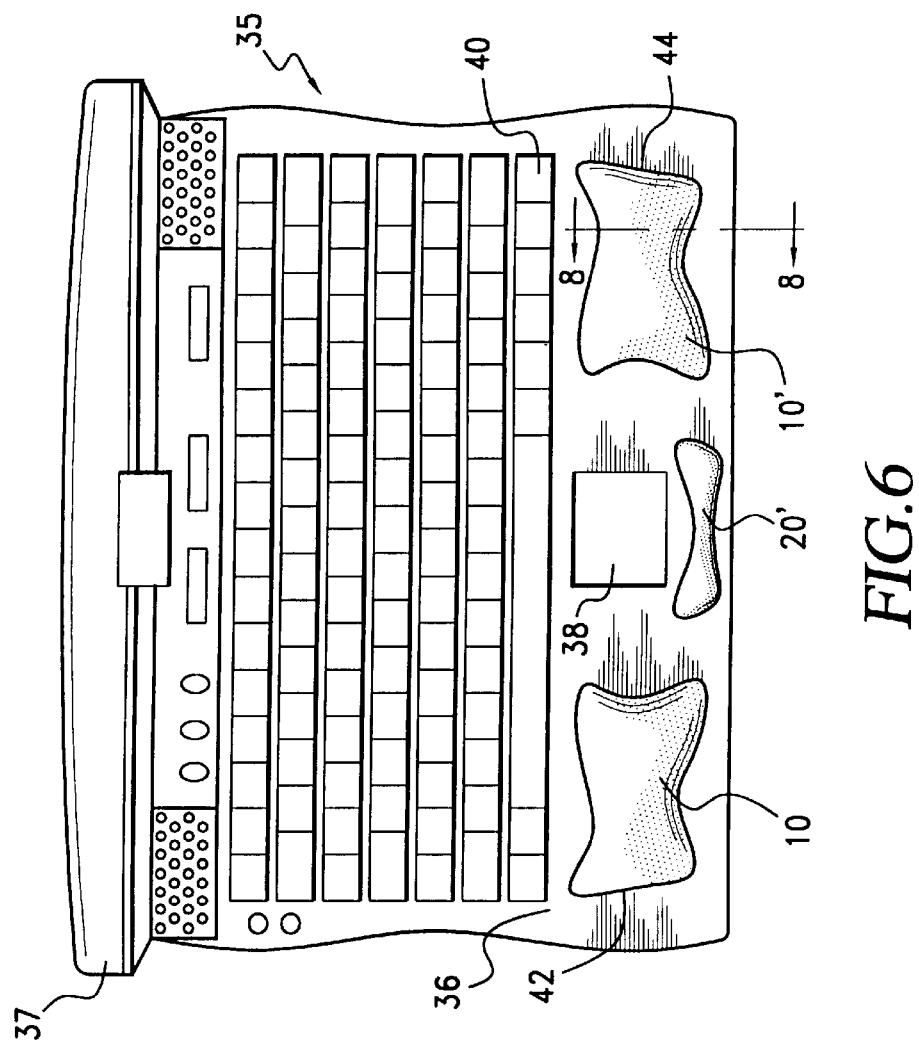

CONFORMABLE PORTABLE COMPUTER HAND PADS

CROSS-REFERENCE TO RELATED APPLICATIONS

This U.S. Patent Application is based upon U.S. Provisional Patent Application Serial No. 60/119,796, filed Feb. 11, 1999, and entitled "COMPUTER HAND PAD".

BACKGROUND OF THE INVENTION

1. Field of the Invention

This invention relates to ergonomic hand rests for computers and other electronic devices. These rests support the user's wrist, palm, fingers and possibly forearm. In particular, the invention relates to soft, conforming hand pads constructed integrally with the keyboard body of portable laptop or notebook computers. While the present hand pads were developed with the portable computer in mind, the pads may be used in various other keyboard applications, including desktop computer keyboards, typewriters, calculators, and other equipment including a keyboard.

2. Background of the Invention

The use of computer input devices such as computer keyboards, mice, tracking pads and other similar devices is becoming increasingly prevalent in modern computing. However, continuous use of these input devices is often uncomfortable, and sometimes hazardous to the user. For example, use of keyboards, mice and tracking pads requires positioning the user's hand in a generally horizontal position which can cause the tendons in the hand to lie in a strained position, often resulting in discomfort.

Simple flat pads are currently available for supporting a user's hand as he or she manipulates the input devices. Such pads have been further refined to provide contoured surfaces on which to support the user's hand.

Unfortunately, these prior attempts have been met with only limited success, since they often fail to conform to a specific user's hands and, therefore, only offer limited relief from the pressures being applied as the user manipulates his or her input device. A need, therefore, exists for a computer pad offering users a soft and individually conforming hand surface. The present invention provides such a computer hand pad.

SUMMARY OF THE INVENTION

It is, therefore, an object of the present invention to provide a computer pad for use in supporting the hand of a user as he or she manipulates a computer input device. The pad includes a body member shaped and dimensioned for positioning adjacent the computer input device. The body member includes a viscoelastic material adapted to conform to the shape of the hand of a user.

It is also an object of the present invention to provide a pad wherein the body member is a viscoelastic solid-phase material.

It is another object of the present invention to provide a pad wherein the viscoelastic solid-phase material is a styrenic thermoplastic elastomer.

It is a further object of the present invention to provide a pad wherein the viscoelastic material is a viscous liquid material contained within an elastomeric bag.

It is also another object of the present invention to provide a pad wherein the viscous liquid material is a silicone gel or thermoplastic elastomer.

It is yet another object of the present invention to provide a laptop computer including a keyboard housing and a monitor. The keyboard housing supports a plurality of keys for manipulation by a user of the computer. The computer also includes at least one hand pad formed in the keyboard housing at a position adjacent the plurality of keys for supporting the hand of a user as the user manipulates the plurality of keys and rests the hand on the keyboard housing.

It is still a further object of the present invention to provide a laptop computer wherein the keyboard housing includes at least one recess in which the at least one hand pad is positioned.

It is also an object of the present invention to provide a laptop computer wherein the keyboard housing includes first and second recesses on opposite sides of the keyboard housing, and first and second hand pads are respectively positioned within the first and second recesses.

It is another object of the present invention to provide a laptop computer including a tracking pad formed within the keyboard housing and an additional hand pad formed in the keyboard housing at a position adjacent the tracking pad for supporting the hand of a user as the user manipulates the tracking pad and rests the hand on the keyboard housing.

It is a further object of the present invention to provide a laptop computer wherein the keyboard housing includes a recess in which the additional hand pad is positioned.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 6 is a top view of hand rests attached to the top surface of a laptop computer keyboard.

FIG. 7 is an exploded view of a hand rest shown attached to a computer keyboard in FIG. 6.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
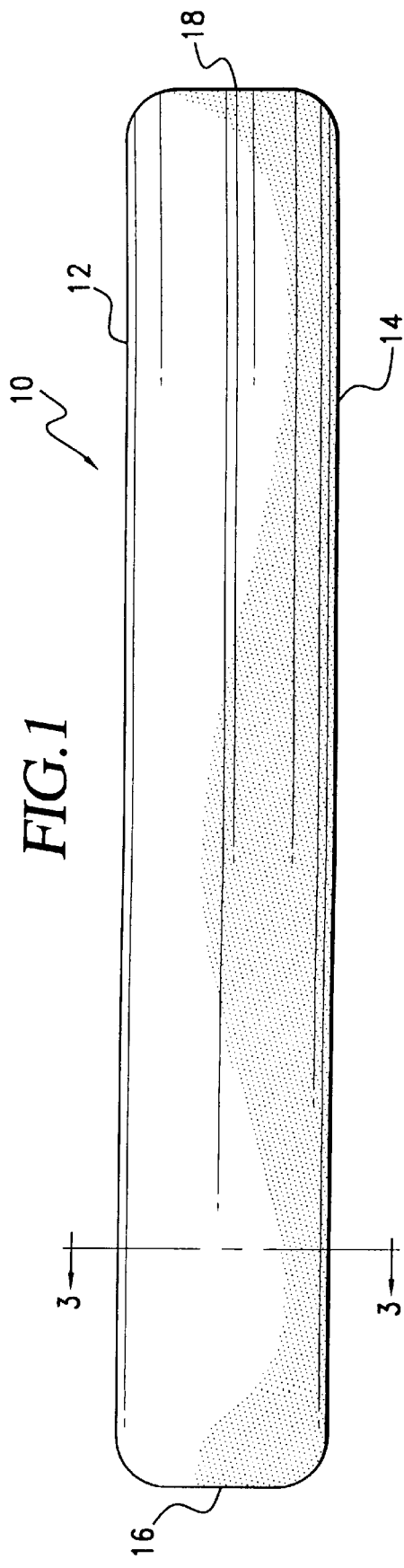
FIG. 1 is top view of a keyboard pad constructed from a solid, soft, viscoelastic material.
Figure 3:
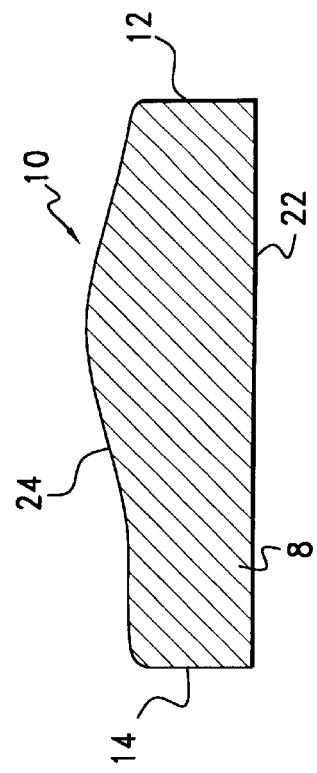
FIG. 3 is a cross-sectional view of a solid keyboard pad as seen from line 3—3 in FIG. 1.
Figure 2:
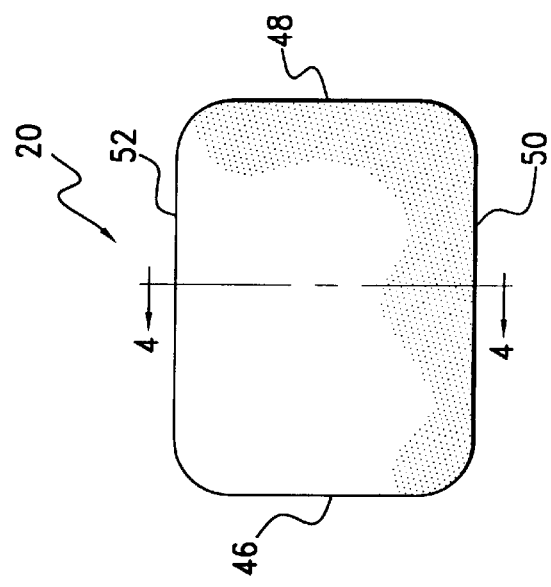
FIG. 2 is a top view of a mouse pad constructed from a solid, soft, viscoelastic material.
Figure 5:
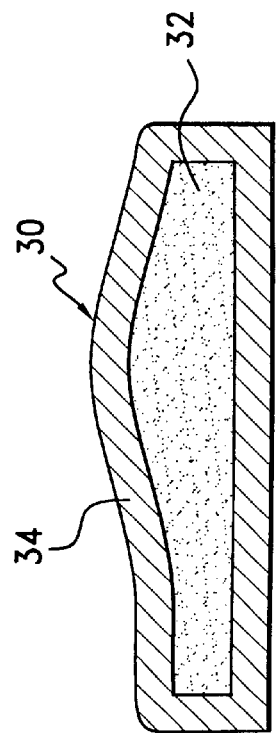
FIG. 5 is a cross-sectional view of a keyboard pad comprising a gelatinous material interposed within a more resilient material.
Figure 4:
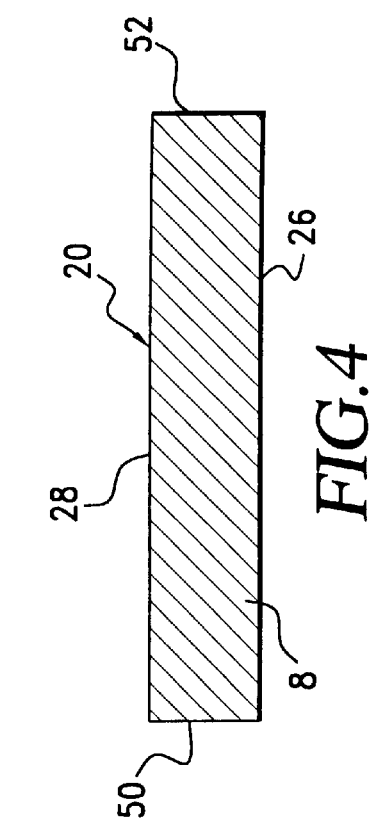
FIG. 4 is a cross-sectional view of a solid mouse pad as seen from line 4—4 in FIG. 2.

With reference to FIGS. 1, 2, 3, 4 and 5, the various embodiments of the present invention are disclosed. FIG. 1 shows a top view of a responsive, viscoelastic solid keyboard pad 10, while FIG. 2 shows a top view of a responsive, viscoelastic solid mouse pad 20. FIG. 3 shows a cross-sectional view of a responsive, viscoelastic solid keyboard pad 10, and FIG. 4 shows a cross-sectional view of a responsive, viscoelastic solid mouse pad 20. Finally, FIG. 5 shows a cross-sectional view of a viscoelastic, gelatinous keyboard pad 30 comprising a gelatinous material 32 interposed within an elastomeric bag 34.

Functionally, the various embodiments perform similarly, providing a soft, conforming surface on which the user may rest his or her hands while typing or operating a mouse, or similar tracking device. The materials used for the hand pads provide a soft and smooth surface for the user's hands. Preferably, the hardness of the materials used for the hand pads, as measured by a Shore A Durometer, is less than 50.

Referring again to FIG. 1, a flat, rectangular solid keyboard pad 10 is shown. The solid keyboard pad has a first long side 12, a second long side 14, a first short side 16 and a second short side 18. The first long side 12 and the second long side 14, generally equal in length, range from approximately five inches to approximately twenty inches in length. The first short side 16 and the second short side 18, generally equal in length, are shorter in length than the first long side 12 and the second long side 14. The exact dimensions of the solid keyboard pad 10 depend on the specific application and the size of the keyboard with which the solid keyboard pad 10 is used.

FIG. 3 shows a cross-sectional view of the solid keyboard pad 10 shown in FIG. 1. The solid keyboard 10 includes a bottom surface 22 and a top surface 24. The bottom surface is generally flat, such that the solid keyboard pad 10 rests firmly on a flat support surface. The top surface 24 is contoured to comfortably match the surface of a user's hand which will rest on the top surface 24 while the user types or operates a mouse.

In accordance with the embodiment disclosed in FIGS. 1, 2 and 3, the viscoelastic solid keyboard pad 10 and viscoelastic solid mouse pad 20 are preferably a viscoelastic solid-phase polymer material 8. The viscoelastic solid-phase polymer material 8 is preferably a styrenic thermoplastic elastomer containing, for example, KRATON, which is manufactured by Shell Chemical Company. It should be appreciated that the styrenic thermoplastic elastomer containing, for example, KRATON, may be altered via chemical and manufacturing processes. This alteration would likely include the softening of the thermoplastic elastomer. Also other treatments may be used without departing from the spirit of the present invention. Where the viscoelastic solid keyboard pad 10 is formed from a responsive, and relatively viscoelastic solid-phase polymer material 8, the outer surfaces 22, 24 of the viscoelastic solid keyboard pad 10 are formed from the same viscoelastic material as the remainder of the viscoelastic solid keyboard pad 10.

Similarly, as seen in FIG. 4, where the viscoelastic solid mouse pad 20 is formed from a responsive, and relatively viscoelastic solid-phase polymer material, the outer surfaces 26, 28 of the viscoelastic solid mouse pad 20 is formed from the same viscoelastic material as the remainder of the viscoelastic solid mouse pad 20. FIG. 2 shows a top view of a viscoelastic solid mouse pad 20. The mouse pad 20, like the keyboard pad 10, is generally rectangular. The dimensions of the mouse pad sides 46, 48, 50, 52 range from approximately 2 inches to approximately 8 inches.

Another alternate embodiment of the present invention is disclosed in FIG. 5. The alternate embodiment is substantially similar to the embodiments described above with reference to FIGS. 1, 2, 3 and 4, but replaces the viscoelastic solid-phase polymer construction with a viscous liquid material 32 contained in an elastomeric bag 34.

In accordance with the embodiment disclosed in FIG. 5, the viscoelastic gelatinous keyboard pad 30 is a viscous liquid material 32 contained in an elastomeric bag 34. The viscous liquid 32 is preferably a silicone gel or oil and the elastomeric bag 34 is preferably a silicone sheet or a thermoplastic elastomer. While preferred materials are disclosed above, other materials exhibiting similar properties may be used without departing from the spirit of the present invention.

FIG. 6 shows two viscoelastic solid keyboard pads 10, 10' used in conjunction with a laptop computer 35 having a keyboard housing 36 and a monitor 37. First and second keyboard pads 10, 10' are strategically positioned on the top of a keyboard housing 36 of the laptop computer 35, adjacent the side of the keyboard housing 36 where the user is positioned to type. In the preferred embodiment, one viscoelastic solid keyboard pad is located on each side of a tracking pad 38 located on the top of the keyboard housing 36 adjacent the user. The viscoelastic solid keyboard pads 10, 10' are positioned adjacent the lowest row of keys 40 on the keyboard housing 36. The strategic placement of the viscoelastic solid keyboard pads 10, 10' enables a user to rest his or her hands on the keyboard pads while typing and using the tracking pad 38. An additional mouse pad 20' is also positioned in front of the tracking pad 38.

Figure 8:
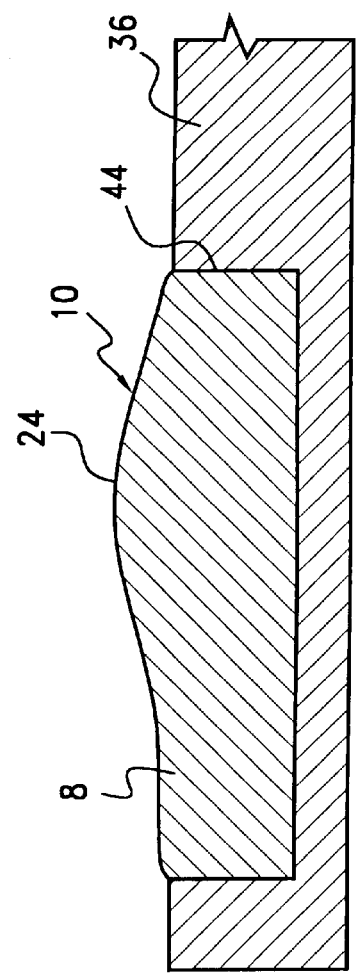
FIG. 8 is a cross-sectional view of the keyboard and hand rest assembly shown in FIG. 6, as seen along line 8—8.

FIG. 8 shows a cross-sectional view of the viscoelastic solid keyboard pad 10 attached to the keyboard housing 36. In the preferred embodiment, each keyboard pad 10, 10' is respectively molded into first and second recesses 42, 44 in the surface of the keyboard housing 36. As those of ordinary skill in the art will certainly appreciate, other methods for securing the viscoelastic solid keyboard pads in the recesses 42, 44 of the keyboard housing 36 may be employed without departing from the spirit of present invention. Although the top surface 24 of the keyboard pads 10, 10' are shown to be in approximately the same plane as the surface of the keyboard housing 36, the thickness of the keyboard pads may vary, thereby offsetting the top surface 24 of the keyboard pads 10, 10' and the surface of the keyboard housing 36.

The preferred embodiment shows the keyboard pads 10, 10' molded into recesses 42, 44 in the surface of the keyboard housing 36. The keyboard pads 10, 10' may be used, however, with a keyboard housing 36 having no recesses. In alternate embodiments, the keyboard pad 10, 10' could be formed and simply placed over the top surface of the keyboard housing 36, adjacent the side where the user is positioned. Similarly, the keyboard pad 10 may be adhered to the top surface of the keyboard housing 36 using an adhesive or other method well known to those of ordinary skill in the art.

While the embodiment disclosed above relates to the use of a viscoelastic solid-phase material in the construction of the pads 10, 10', 20', the pads 10, 10', 20' may certainly be constructed in the manner discussed above with reference to FIG. 5 without departing from the spirit of the present invention. Similarly, the positioning of the pads 10, 10' is merely exemplary, and those skilled in the art will appreciate the various locations at which the pads may be positioned without departing from the spirit of the present invention.

In addition to providing support for the user's hands while they rest upon the keyboard housing, it is also contemplated that the keyboard pads will provide insulation helping to maintain the laptop computer at a desired temperature.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A laptop computer, comprising:

a one-piece, unitary keyboard housing and a monitor, the keyboard housing supporting a plurality of keys for manipulation by a user of the computer; and at least one hand pad recess formed on a top surface of the keyboard housing and a hand pad formed in the recess to create a unitary structure, the at least one hand pad being positioned adjacent the plurality of keys for supporting the hand of a user as the user manipulates the plurality of keys and rests the hand on the keyboard housing.

2. The laptop computer according to claim 1, wherein the keyboard housing includes first and second recesses on opposite sides of the keyboard housing, and first and second hand pads are respectively positioned within the first and second recesses.

3. The laptop computer according to claim 1, further including a tracking pad formed within the keyboard housing and an additional hand pad formed in the keyboard housing at a position adjacent the tracking pad for supporting the hand of a user as the user manipulates the tracking pad and rests the hand on the keyboard housing.

4. The laptop computer according to claim 3, wherein the keyboard housing includes an additional recess in which the additional hand pad is positioned.

5. The laptop computer according to claim 1, wherein the hand pad is a viscoelastic solid-phase material.

6. The laptop computer according to claim 5, wherein the viscoelastic solid-phase material is a styrenic thermoplastic elastomer.

7. The laptop computer according to claim 1, wherein the viscoelastic material is a viscous liquid material contained within an elastomeric bag.

8. The laptop computer according to claim 7, wherein the viscous liquid material is a silicone gel or thermoplastic elastomer.

9. A laptop computer, comprising:

a one-piece, unitary keyboard housing and a monitor, the keyboard housing supporting a plurality of keys and a tracking pad for manipulation by a user of the computer; and at least one hand pad recess formed on a top surface of the keyboard housing and a hand pad formed in the recess to create a unitary structure, the at least one hand pad being positioned adjacent the tracking pad for supporting the hand of a user as the user manipulates the tracking pad and rests the hand on the keyboard housing.

10. The laptop computer according to claim 9, wherein the hand pad is a viscoelastic solid-phase material.

11. The laptop computer according to claim 10, wherein the viscoelastic solid-phase material is a styrenic thermoplastic elastomer.

12. The laptop computer according to claim 9, wherein the viscoelastic material is a viscous liquid material contained within an elastomeric bag.

13. The laptop computer according to claim 12, wherein the viscous liquid material is a silicone gel or thermoplastic elastomer.

* * * * *